3,586,501
PHOTOGRAPHIC FILM UNIT
Warren E. Norquist, Weston, Eugene F. Marckini, Lexington, and Paul J. Vitali, Sharon, Mass., assignors to Polaroid Corporation, Cambridge, Mass.
Filed Feb. 12, 1968, Ser. No. 704,816
Int. Cl. G03c 1/48; G03d 9/02
U.S. Cl. 96—29
19 Claims

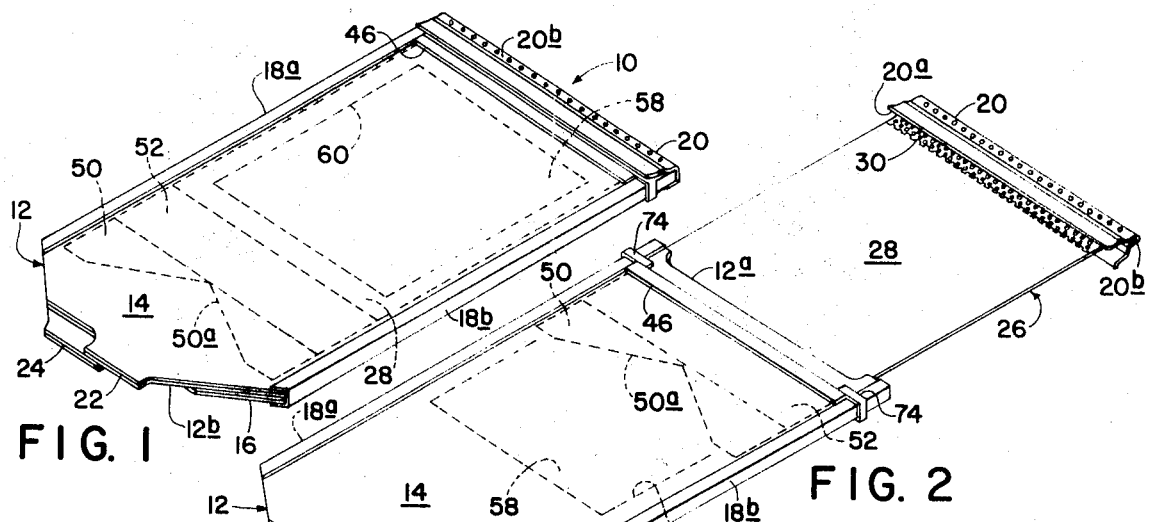
FIG. 1  FIG. 2
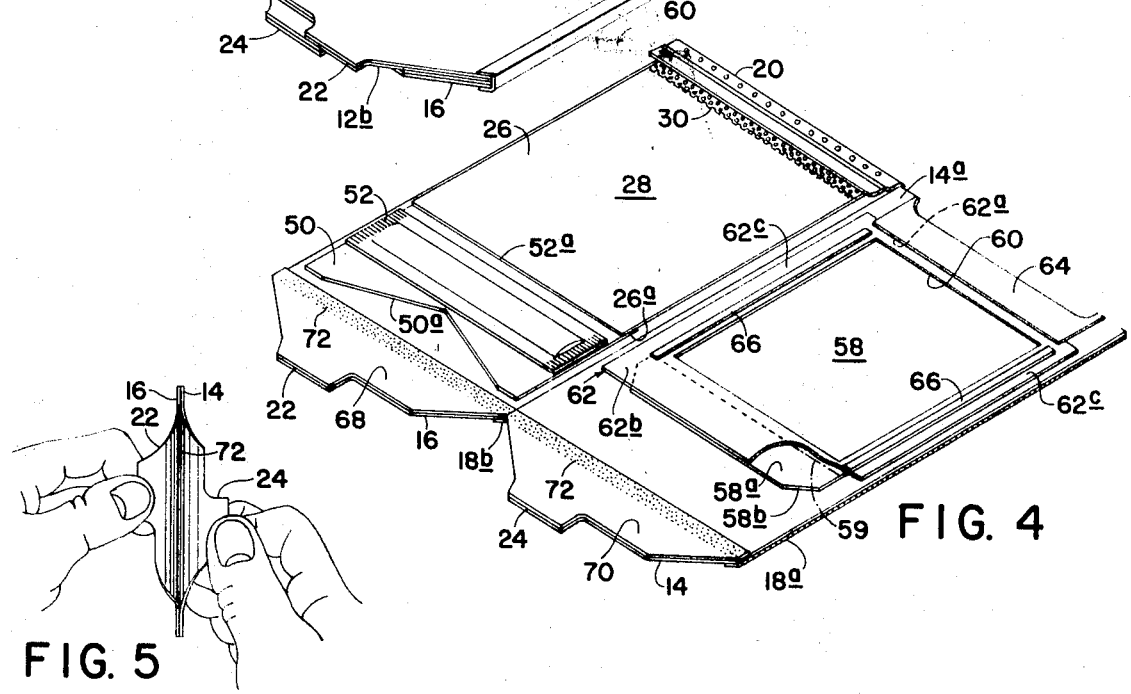
FIG. 4
FIG. 5
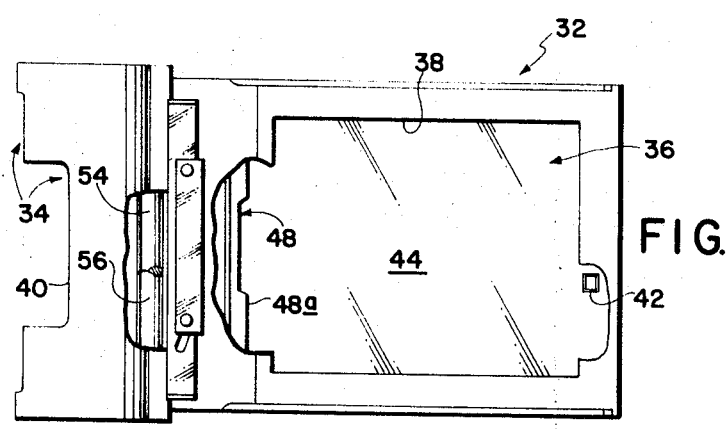
FIG. 3
INVENTORS
Warren E. Norquist
Eugene F. Marckini
and
Paul J. Vitali
BY Brown and Mikulka
ATTORNEYS 3,586,501
Patented June 22, 1971

ABSTRACT OF THE DISCLOSURE

A photographic film unit of the self-developing type including a pair of superposed sheets having generally rectangular sections provided with tabs at one end thereof. A separable seal extends across the sheets inwardly of the tabs and they are releasably connected together along their juxtaposed edges extending on the opposite side of the seal from the tabs. The film unit further includes an image-receiving sheet, a rupturable container of processing fluid, a mask and rails, positioned inside the envelope formed by the attached superposed sheets, and a photosensitive sheet adapted to be selectively inserted into and removed from the envelope through its opened end. Tapes connecting superposed sheets, adjacent the opening provided between same serves to retain them in hinged relationship when the aforesaid seal and connections are broken. The mask is firmly attached to one of the superposed sheets and overlaps a portion of the image-receiving sheet.

---

The film unit of the present invention, in forms adapted to produce black-and-white or color prints, embodies significant improvements relative to those film units of a comparable category currently sold by Polaroid Corporation, Cambridge, Mass., U.S.A. and described, for example, in U.S. Pat. 3,053,160. The subject units are adapted to use with a film holder-processor, hereinafter termed a "film holder," of the type known as "Polaroid Land 4 x 5 Film Holder #500," also sold by Polaroid Corporation and described in U.S. Pat. 2,933,993. Additionally, it is adapted to use with an improved film holder, described in the copending U.S. patent application Ser. No. 693,950 filed Dec. 27, 1967 for "Photographic Film Holder-Processor."

Either of the above-referenced film holders is intended to be mounted on the back of a conventional camera utilizing complementary mounting means and the exposure components of the latter. When thus mounted, as, for example, in the manner of a standard film holder on a 4 x 5 press or view camera, the film holder serves, through a relatively simple structure, to convert the camera into one capable of delivering a finished print immediately following the photographic exposure. This is accomplished in the general manner of the well-known process of "picture-in-a-minute" photography, identified with products of Polaroid Corporation, by manually drawing the film unit, after its exposure, between compressive means of the film holder. A processing liquid is thereby released and spread between photosensitive and other layers of the film unit to effect rapid development and diffusion transfer of image-forming components and formation of the ultimate positive image. Processes of image formation of a related category, in black-and-white and color, are described in U.S. Pats. 2,543,181 and 2,983,606, respectively. As previously intimated, it is to means facilitating access to, and the separation and removal of a finished print from discardable or waste portions of the film unit that the structure of the present invention particularly relates.

In accordance with the foregoing considerations, objects of the present invention are to provide an improved photographic film unit of a so-called self-developing type embodying a releasably-confined processing liquid adapted to use with a film holder separably or permanently attachable to a camera, in which film unit are included means for facilitating a more convenient and rapid access to and removal of a finished print in black-and-white or full-color contained therewithin; to provide an improved confinement of any excess of the released processing liquid; to provide a film unit of the character described including a protective envelope slidably withdrawable for effecting a photographic exposure and returnable thereafter for processing, the envelope being readily openable and enclosing such components as a photosensitive film, a releasable processing liquid in an openable container, an image-receiving sheet, an image-defining mask, excess-liquid trapping means, and spacer means for determining the thickness of a layer of spread processing liquid, together with external detent components for determining the retention of the film component and a given withdrawal of the envelope for exposure purposes; to provide a film unit of the category set forth in which a pair of releasably-sealed tabs or finger-grips is located at an end thereof, an individual tab being integral with each envelope wall so as to extend endwise thereof and slightly exteriorly of the film holder for access purposes when the film unit is loaded therein; to provide a film unit in which a pair of tabs of the type described permit manual withdrawal of the film unit from the film holder after its photographic exposure and, in conjunction with cooperating releasable and rendable envelope structure, enable a manual separation of the envelope walls relative to one another; to provide a construction within the envelope enabling, after release and spreading of the processing liquid, the positive peeling, as a unit, of a negative film component carrying a photosensitive emulsion and an adhering masking component delineating an image area from an image-receiving or print-carrying surface, without manual contact with the processing liquid or permitting an escape of an excess of the latter to front or rear portions of the print-carrying medium; to provide a image-receiving or print-carrying component of a type in which a finished print is adapted to be outlined by a symmetrical margin or frame; to provide a film unit, as characterized, in which bonding materials and surfaces especially adapted to a selective attachment and separation of components are utilized; and to provide a structure wherein minimum areas of relatively costly materials are employed.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description, and the scope of the application of which will be indicated in the claims.

For a fuller understanding of the nature and objects of the invention, reference should be had to the following detailed description taken in connection with the accompanying drawing wherein:

FIG. 1 is a diagrammatic perspective front or exposure-side view of the film unit of the invention;

FIG. 2 is a diagrammatic perspective view, similar to that of FIG. 1, showing a protective envelope partially withdrawn for performing a photographic exposure of a photosensitive emulsion;

FIG. 3 is a diagrammatic front view of a film holder adapted to use in exposing and processing the film unit of the invention;

FIG. 4 is a similar perspective view in which one of a pair of longitudinal envelope binding-tapes has been severed and the envelope has been opened to expose the internal components; and FIG. 5 is a diagrammatic end view of the film unit, assuming completion of its exposure and processing, to illustrate manual separation of the envelope tabs and opening of the envelope walls to provide access to the finished print therewithin.

Referring now to FIG. 1 of the drawing, the film unit 10 is shown in the form in which it is supplied, ready for loading in a film holder, which may be assumed as attached to a camera. The front surfaces of the film unit (upper surface in FIGS. 1 and 2) is that which is adapted to face the exposure aperture of the film holder and, accordingly, the lens of the camera. The film unit comprises an envelope 12 formed of two principal sheets or walls 14 and 16, composed of a suitable opaque paper stock fastened together along their longitudinal edges by the folded binding side tapes 18a and 18b. The latter are composed of an opaque polyethylene-coated paper bonded, as by heat-sealing, to the margins of the walls 14 and 16.

One end 12a of the envelope, namely, a leading end thereof in terms of exposure operations and a trailing end with reference to processing manipulation as described hereinafter, is unsealed and, as shown in FIG. 1, is snugly, but releasably positioned within the flared opening or mouth 20a of a metallic clip 20, the latter providing a shield for this open end of the envelope. The envelope is thus safeguarded against an entrance thereinto of extraneous light. The opposite end 12b of the envelope terminates in a pair of unbonded partially laterally-offset tabs or finger-grips 22 and 24, one tab being in part formed by an integral, endwise, narrowed extension of the envelope wall 14 and the other by a similar extension of the envelope wall 16. Inner wall portions of the film unit, located slightly inwardly of the tabs, are releasably-bonded together to prevent an entrance of light or foreign matter, as will be described below.

The clip or cap 20 is fastened by crimped portions 20b to one end of the exposable film component or negative 26, the latter carrying a photosensitive emulsion 28 on its front surface and, bonded to the emulsion adjacent to the clip 20, a perforated paper trapping component or strip 30 for taking up any excess of a processing liquid which has been released to and spread across the photographically exposed emulsion. Photographic exposure of the emulsion is effected by withdrawing the envelope from its covering position to a given degree, as illustrated in FIG. 2. While the clip 20 is specified as of metal, it may, alternatively, be composed of a stiffened paper or plastic and bonded to the film component 26.

The steps of photographic exposure and processing of the film unit are performed within a film holder 32 of the type shown in FIG. 3 fastened to a camera. The film unit is inserted therein, clip 20 end first and with the film emulsion 28 facing forwardly, through a light-shielded aperture or slot extending transversely across one end of the film holder and indicated by the arrows 34. Upon insertion to its maximum distance, the envelope and underlying film emulsion 28 are located in an exposure chamber 36 so as to be framed within an aperture 38 thereof. At this position, the tabs 22 and 24 of the film unit are located exteriorly of the film holder in the recessed area 40, available for manually retracting the envelope and, after an exposure, for withdrawing the entire film unit. Also at this loaded position of the film unit, a flared edge 20a of the clip 20 is engaged by an edge of a releasable detent element 42 which protrudes slightly through an aperture formed in the rear wall 44 of the exposure chamber.

A raised transverse strip or bead 46 extends across the front of the envelope wall near its unsealed end 12a. In inserting the film unit in the film holder, the film unit passes freely beneath a pivotal detent means 48 mounted slightly forwardly of wall 44 and having functional contacting edges 48a. These edges are biased rearwardly toward wall 44, and accordingly, toward the front wall 14 of the envelope when mounted in the film holder. To perform a photographic exposure, the envelope is manually grasped by the tab portions 22 and 24, located at recess 40, and the envelope is drawn away from the film component 26, the latter being located at a focal plane and retained within the exposure aperture 38 by engagement of detent 42 with the clip 20. The envelope is thus drawn away from the film emulsion 28 until the detent edges 48a contact the strip 46 which constitutes a limit stop. At this stage the envelope has been withdrawn to a degree which permits an unobstructed exposure of the film emulsion within the exposure aperture 38. Lens and shutter means of the camera to which the film holder is attached are, of course, utilized for the purpose. After the photographic exposure, the envelope is returned to its covering position, its open end again being inserted within the clip 20, whereby the film unit is now ready for processing.

The film unit will now further be described relative to its processing components. Where bonding of adjacent surfaces is stated, as for example, of paper-to-paper or to a plastic, a choice of adhesive materials such, for instance, as polyvinyl chloride, polyethylene, or some other suitable bonding substances is readily possible. A bonding material of general suitability relative to surfaces of the subject invention is polyethylene, the bond being effected by heat and pressure or by an ultrasonic method. Accordingly, a polyethylene type of adhesive may be assumed, by way of example, as the material employed unless otherwise specified, it being understood that the structure is not limited thereto.

In FIG. 4, it is to be assumed, for illustrative purposes only, that the binding tape 18a has been severed as by cutting edge, and envelope wall 14 flipped over to the right to expose the envelope interior. The components of the film unit contained therewithin are thereby shown in detail. The film component 26, in addition to elements previously described, includes a paper appendage or so-called leader 50 bonded to a rear surface portion 26a thereof. The leader 50, thus termed because it leads other components in passing between compressive means to be described, is composed for economy purposes of a less-expensive material than the base and emulsion of film 26. Furthermore, it is less flexible. Accordingly, any tendency of the film component 26 to buckle during return movement of envelope 12 is avoided. The recessed portion 50a of the leader is provided to prevent grasping and applying a withdrawing force to the film component 26 also, when envelope 12 is withdrawn to perform the exposure.

A container 52 of a type collapsible under compression is mounted on leader 50. A processing liquid carried within the container is adapted to be released between separably-sealed edges 52a when the film unit is drawn, from left-to-right as shown, between compressive means, namely, between a pair of pressure rolls 54 and 56 of the film holder. These pressure rolls are spaced apart by cam and lever means of the film holder, mounted at the reverse side thereof and not shown, to permit unrestricted passage of the film unit therebetween during the initial loading operation, as well as the aforementioned slidable movement of the envelope for exposure purposes. After the exposure, the pressure rolls are brought together by the cam and lever to their compressive relation, the detent means 42 and 48 simultaneously being retracted from their engaging positions. The film unit is then adapted to be advanced between the pressure rolls for release and spreading of the processing liquid and to be completely withdrawn from the film holder through the entrance-exit aperture at 34, its movement being achieved by drawing upon the tabs 22 and 24 which will be located at the recessed area 40.

The image-forming process involves release of the processing liquid from the container 52, as above described, and its spreading throughout facing surfaces of the emulsion 28 and a superimposed image-receiving sheet 58, the latter having, for example, a baryta-coated surface adapted to carry the image. The ultimate photographic image or print is produced by development of the negative formed as a latent image in emulsion 28, and the diffusion transfer of image-forming components to the surface of sheet 58 and/or to a layer of the solidified processing liquid which has been distributed throughout its surface. The actual image area is defined by a rectangular aperture 60 formed in a masking sheet 62, the latter being suitably composed of a super-calendered tissue paper and releasably-bonded to the surface of sheet 58. A retaining or so-called "hold-down" strip 64 composed, for example, of an opaque paper is bonded to an underlying edge of the masking sheet at 62a and to the inner surface 14a of envelope wall 14. Strip 64 also contributes to a light-tight condition at that end of the envelope at which it is located.

The strip 64 serves to attach both the masking sheet 62 and, through adhesion of the latter to the image-receiving sheet 58, the image-receiving sheet as well to the envelope wall 14. In this connection it is to be understood that the bond between the retaining or hold-down strip 64 and the inner surface 14a of envelope wall 14 is stronger than that provided between the mask 62 and image-receiving sheet 58. This permits a clean separation of the image-receiving sheet from the mask after formation of the positive print has been completed. Where the process involves preservation of the negative, the image-receiving sheet 58 and mask 62 are stripped from the negative 26 as a unit. The mask is then stripped from the positive by means of the overhanging or tab mask portions 62b.

A pair of spacer rails or strips 66 is bonded to the exposed surface of mask 62 which surface, in the unopened envelope of FIG. 1, would be that facing the emulsion 28. The function of strips 66 is to establish or to alter predeterminedly the spacing between pressure rolls 54 and 56 at their compressive relation to provide an appreciable thickness of a layer of distributed and solidified processing liquid. Where the film is of a given color type, the layer of processing liquid may, advantageously, be somewhat thicker than in the instance of a black-and-white film. Where the film is of a black-and-white category or of a color type requiring a less thick layer, the strips 66 may be omitted entirely from the structure. In this connection, it is to be understood that the side tapes 18a and 18b are greatly exaggerated as to thickness in the drawing, of necessity to show layer structure, and that, actually, their thickness would be less than that of strips 66 or any other means which might be included for prespacing the pressure rolls.

It is to be noted that the corners at the leading end-section 58a of the image-receiving sheet are acutely angled at 58b, and that the mask 62 overlies these excised corners 58b and also extends beyond the longitudinal sides of the image-receiving sheet 58, without any adhesive coating thereon which, if present, might result in an inadvertent bond to the envelope wall, for instance during manufacture. It is also to be observed that the section 58a is separably attached to the main body of the image-receiving sheet 58 by semi-perforations 59. The reinforcing end-pieces 68 and 70, composed of an opaque paper, conform in shape to and are bonded to the leading ends of the envelope walls. These end-pieces serve both to stiffen and strengthen the extremity of the film unit to further its resistance to tearing and to permit a more positive return of the envelope after an exposure.

A pair of strip portions 72 formed by a deposition of a cohesive bonding substance, e.g., of a latex type or, alternatively, a hot melt or a heat seal, is disposed transversely across the end-pieces 68 and 70. When the envelope is intact, as in FIGS. 1 and 2, the pressure-sensitive strip portions 72 are in mutually-adhering but releasable contact, thus providing a seal against admittance of light or foreign matter into the leading end of the envelope. When the tabs 22 and 24 are drawn upon divergently with sufficient force, as shown in FIG. 5, to overcome a given cohesive seal strength such as one of approximately 5 pounds, the seal established between strip portions 72 is broken and the envelope can be opened along the side tapes 18a and 18b. This step, of course, follows exposure, processing and removal of the entire film unit from the film holder 32. Completing the structure is a pair of short tape elements 74 overlapping and bonded to the marginal side tapes 18a and 18b, respectively, and to small portions of the outer surfaces of the envelope walls 14 and 16. These tapes which may, appropriately, be termed "stop tear" tapes have a much greater tear strength than the side tapes 18a and 18b and operate to determine the limit to which the latter tapes may be torn to open the envelope, as will be explained hereinafter. They are so located adjacent to the clip 20, at the relation of elements shown in FIG. 1, as to generally underlie the latter.

The procedures of loading, exposing and processing a film unit 10 and extracting the finished print will now be given in an ordered sequence. With the film holder 32 attached to a camera and at a "load" position of its components, the film unit, as shown in FIG. 1, is grasped adjacent to the tabs 22 and 24, and inserted, clip-end-first, through the film-holder aperture 34 and into the exposure chamber 36 to the maximum depth permitted, care being exercised not to unduly compress portions of the envelope overlying the liquid container 52. At this position of the film unit, the detent 42 engages clip 20; the detent 48 is in position for intercepting the envelope limit-stop strip 46, and the pressure rolls 54 and 56 are spaced apart to permit unrestricted movement of the film unit therebetween. Envelope 12 is then withdrawn to the limit established by contact of detent 48 with strip 46, film component 28 being held in the exposure aperture 38 through retention of clip 20 by detent 42. Photographic exposure of emulsion 28 is performed by exposure means of the associated camera, followed by a return of envelope 12 to its covering position.

The film holder components are placed at "process" position, thereby retracting detent means 42 and 48 and placing the rolls 54 and 56 in compressive relation. The film unit is grasped at tabs 22 and 24 and withdrawn through aperture 34, the processing liquid being released from container 52 at separative portions 52a and spread between and throughout the facing adjacent surfaces of the emulsion 28 and the sheet 58, any excess of the liquid entering and being retained within the perforations of trap 30.

After the film unit has been entirely removed from the film holder and following the brief period required for completion of the processing operation, the tabs 22 and 24 are manually grasped as shown in FIG. 5 and the two walls 14 and 16 of the envelope are peeled outwardly away from one another, the side strips 19a and 18b tearing throughout their lengths to the limits provided by the tape elements 74. The interior film, sheet and mask components, held together by the processing liquid which has been spread across their surfaces, are thus exposed to view. The mask 62 and negative film component 26 are stripped away as a unit from the positive sheet 58 to the limit established by the hold-down strip 64. The print bearing sheet 58 is then pulled away from the portion of the mask still engaging it at 62a and is completely removed from the assembly. Finally, the sheet portion 59a is manually separated along the semi-perforations 59 to provide a uniform white margin around the completed print. A modification of the foregoing procedure adapted to preservation of the negative 26 involves stripping of the positive 58 and mask 62 as a unit from the negative, followed by peeling the mask from the positive.

In accomplishing the above-described steps following formation of a positive image, certain of the structural features may be considered as particularly contributing to a predetermined selective manual separation of components or other advantageous operations. These features comprise the separative tabs 22 and 24 cooperating with the releasably-sealed adhesive areas 72 and the releasable side tapes 18 to provide easy access to the envelope interior; the end portions 62b and 58a of the mask 62 and image-receiving (print-carrying) sheet 58, respectively, the acutely angled corners 58b of the sheet 58, and the readily accessible leader 50 enabling each component to be manipulated separately or in association with another, as may be required, and without soiling the fingers through contact with the processing liquid; the differential bonding of the hold-down strip 64 to the envelope wall 14a relative to that of the mask to the print-carrying sheet 58 which permits final release of the latter; the transversely-extending overhanging portions 62c of the mask which prevent any excess of the processing liquid from reaching the back of the sheet 58; the predeterminedly lower tear strength of the side tapes 18a and 18b relative to that of the envelope walls 14 and 16 as, for example, provided by a longitudinal disposition of the paper fibers in the tapes which insures a preferential tearing of the latter during separation of the envelope walls; and the provision of strips 66 which, in addition to their spacing function, serve to reinforce the mask and facilitate its peeling from the print-carrying sheet 58.

In the procedure of tearing the side tapes 18a and 18b during separation of the envelope side walls 14 and 16, it will be understood that the tear strength of these tapes is less than that of the side walls so that the latter will never undergo tearing during the operation. While the provision of side tapes which are rendable or tearable constitutes a preferred example, it would be possible, in a modification, to attach them with a releasable or partially-releasable bond whereby, for example, the tape portion fastened to one envelope wall would remain attached thereto while that fastened to the other wall would disengage during the separative force applied to tabs 22 and 24.

Since certain changes may be made in the above product without departing from the scope of the invention herein involved, it is intended that all matter contained in the above description or shown in the accompanying drawing shall be interpreted as illustrative and not in a limiting sense.

What is claimed is:

1. A self-developing type of photographic film unit for use with apparatus adapted to provide the exposure and processing thereof, comprising a generally-rectangular opaque envelope enclosing in mounted relation therewithin photosensitive and image-receiving sheet components, an image-defining mask and a releasably-contained processing liquid, the envelope being adapted to a partial slidable withdrawal at an open end thereof from the photosensitive sheet component for photographic exposure purposes, the photosensitive sheet component including a cap member fastened to and overlapping a marginal portion thereof which protrudes slightly from said envelope open end to serve both as a light seal at said end and as a retaining means for holding said photosensitive sheet component fixed when said envelope is partially withdrawn therefrom, said envelope including two principal superimposed sheet-like walls releasably bonded together by separable seal means located slightly inwardly of an end opposite to said open end, a pair of elongated tape components bonded to said walls along longitudinal margins and thereof and adapted to releasably fasten together the juxtaposed edges of said walls adjacent thereto, and a pair of tabs each of which is integral with an envelope wall, extends endwise thereof at said opposite end and is adapted to be manually divergently stressed with respect to the other for the purpose of similarly stressing and substantially separating the envelope walls from one another at said separable seal and along said elongated tape components after said processing to provide access to said sheets and mask.

2. A photographic film unit, as defined in claim 1, wherein said elongated tape components are composed of a paper material which has been rendered opaque and which has a tear strength less than that of said envelope walls and less than the retentive strength of the bond of said tape to said walls.

3. A photographic film unit, as defined in claim 1, wherein said elongated tape components are so bonded to one of said wall margins as to separate therefrom during the divergent stress applied to said envelope tabs and walls.

4. A photographic film unit, as defined in claim 1, wherein is included a pair of short transverse tape elements bonded to said elongated tape components and to adjacent portions of both envelope walls located near to said envelope open end, said tape elements serving as limit stop means to determined the extent to which said elongated tape components can be opened to unfasten said juxtaposed edges of said envelope walls.

5. A photographic film unit, as defined in claim 1, wherein is included means bonded to a surface of said photosensitive sheet for retaining any excess of said processing liquid which has been spread across said sheet during said processing, said means being in the form of a paper strip having a plurality of perforations formed therein, said strip being bonded to the emulsion of said photosensitive sheet so as to extend transversely thereacross at a location adjacent to said cap member, said liquid flowing into and being retained in said perforations.

6. A photographic film unit, as defined in claim 1, wherein the mask is releasably-bonded to the image-receiving sheet and includes a central aperture defining the area of said sheet adapted to receive said processing liquid, and wherein a relatively-broad transversely-disposed holding tape is bonded both to said mask and to an inner surface of an envelope wall adjacent to said open end, said holding tape serving to hold said image-receiving sheet and mask predeterminedly positioned within said envelope and the bond of said tape to said mask and inner surface being of a differential strength such that said mask is adapted to be released under a manually-applied stress while the bond to said inner surface is maintained.

7. A photographic film unit, as defined in claim 6, wherein said mask is of such dimensions as to overhang both the longitudinal edges and a pair of angularly excised corners of said image-receiving sheet, the over-hanging areas of said mask being devoid of a bonding substance and those areas overhanging said excised corners being thereby rendered accessible after processing has been completed, for peeling away said mask and photosensitive sheet, as a unit, from said image-receiving sheet, said overhanging mask areas serving to prevent the incursion of any excess processing liquid to the back of said image-receiving sheet.

8. A photographic film unit, as defined in claim 6, wherein is included a pair of elongated strips of predetermined thickness so bonded to a surface of said mask as to extend longitudinally of said surface at either side transversely of said central aperture, said strips serving both as spacer means for controlling the spacing of a pair of compressive means between which the film unit is introduced, and as structural ribs for strengthening said mask.

9. A photographic film unit, as defined in claim 1, wherein an outer surface of an envelope wall includes limit stop means affixed thereto for cooperating with complementary releasable detent means of a film holder to determine the extent to which said envelope can be withdrawn for exposure purposes, said cap member also being adapted to cooperate with releasable detent means of said film holder for holding said photosensitive sheet fixed during the withdrawal of said envelope.

10. A photographic film unit, as defined in claim 1, wherein said separable seal means is composed of a pair of mating strips of applied cohesive bonding substance, and wherein said sheet components, mask, and means releasably-containing said processing liquid are mounted through the medium of a bonding substance adapted to heat sealing, said substance being of an opaque type at areas where a light seal is imperative.

11. A photographic film unit, as defined in claim 1, wherein is included a pair of reinforcing endpieces fixedly bonded to inner surfaces of said envelope walls at said opposite end, said end-pieces conforming in contour to said tabs and to the areas adjacent thereto and serving to stiffen and strengthen said envelope walls, said separable seal means being formed on opposed inner surface portions of said end-pieces.

12. A photographic film unit, as defined in claim 9, wherein said film holder is adapted to be releasably attached to a camera, the exposure means of the latter being utilized to perform the exposure of said photosensitive sheet component.

13. A photographic film unit for use with apparatus adated to provide the exposure and processing thereof, comprising a generally-rectangular opaque envelope enclosing in mounted relation therewithin a plurality of materials adapted to the production of a photographic print, said envelope including two principal superimposed sheet-like walls releasably bonded together by separable seal means located slightly inwardly of an end thereof and along longitudinal margins thereof, and a pair of tabs each of which is integral with an envelope wall, extends endwise thereof at said end and is adapted to be manually divergently stressed with respect to each other for the purpose of similarly stressing and substantially separating the envelope walls from one another at said separable seal means after said processing to provide access to said photographic print.

14. A self-developing type of photographic film unit for use with apparatus adapted to provide the exposure and processing thereof, comprising a generally-rectangular opaque envelope enclosing in mounted relation therewithin a photosensitive component and means adapted to provide a photographic print, the envelope being adapted to a partial slidable withdrawal at an open end thereof from the photosensitive component for photographic exposure purposes, said envelope including two principal superimposed sheet-like walls releasably bonded together by separable seal means located slightly inwardly of an end opposite to said open end, a pair of elongated tape components bonded to said walls along longitudinal margins thereof and adapted to releasbly fasten together the juxtaposed edges of said walls adjacent thereto, and a pair of tabs each of which is integral with an envelope wall, extends end wise thereof at said opposite end and is adapted to be manually divergently stressed with respect to the other for the purpose of similarly stressng and substantially separating the envelope walls from one another at said separable seal and along said elongated tape components after said processing to provide access to said print.

15. A self-developing type of photographic film unit for use with apparatus adapted to provide the exposure and processing thereof, comprising:
a first opaque sheet having a generally rectangular section with a tab extending from one end thereof;
a second opaque sheet having a section substantially the same dimensions as said generally rectangular section of said first sheet, with a tab extending from one end thereof, disposed in overlaying relationship to said first sheet with said tabs positioned adjacent one another;
means for effecting a relatively narrow separable seal between said sheets transverse thereof adjacent and inwardly of the free ends of said tabs;
means for effecting a rupturable connection between the respective juxtaposed edges of said sheets extending on the opposite side of said seal from said tabs thereby forming an envelope having an opening between said sheets at the end thereof furthermore disposed from said tabs;
an image-receiving sheet releasably retained within said envelope;
a photosensitive sheet slideably mounted within said envelope for removal therefrom through said opening to facilitate its exposure and subsequent insertion thereinto to facilitate its processing; and
means for initially storing a quantity of processing fluid within said envelope and for releasing said fluid between said image-receiving and photosensitive sheets responsive to relative motion being effected between said envelope and at least one force applying member;
whereby after exposure and processing operations have been completed to produce a viewable image in said image-receiving sheet, said tabs may be pulled apart to effect the rupture of said seal and said connections to open said envelope exposing said image-receiving sheet which can then be removed therefrom and said sheets may be returned to their original overlaying relationship to provide a disposable container for said processed photosensitive sheet and excess said fluid.

16. The film unit of claim 15 including means for connecting said sheets together adjacent their said open end so that they remain connected together at such time as said seal and said rupturable connections are ruptured to expose said image-receiving sheet.

17. The film unit of claim 15 wherein said tabs are configured so that at least portions thereof do not overlay each other to facilitate manual gripping of same preparatory to effecting the rupture of said seal and connections.

18. The film unit of claim 15 additionally including a mask overlaying and initially adhered to said image-receiving sheet to define the image area thereof and means for attaching said mask to one of said opaque sheets in a manner whereby, when said processed image-receiving sheet is removed from said envelope, it will be separated from said mask which remains connected to said one opaque sheet.

19. The film unit of claim 18 wherein at least one portion of said mask extends beyond an edge of said image-receiving sheet to facilitate the removal of said image-receiving sheet from the other components of said film unit after the rupturing of said seal and said connections.

References Cited

UNITED STATES PATENTS

| | | | |
|---|---|---|---|
| 3,053,160 | 9/1962 | Bechelder et al. | 96—76 |
| 2,609,296 | 9/1952 | Land | 96—76 |
| 2,648,463 | 8/1953 | Scherer | 206—56 |
| 3,342,600 | 9/1967 | Downey | 96—29 |
| 3,201,248 | 8/1965 | Erikson | 96—76 |
| 3,415,645 | 12/1968 | Land | 96—29 |

WILLIAM D. MARTIN, Primary Examiner

M. SOFOCLEOUS, Assistant Examiner

U.S. Cl. X.R.

95—13; 96—76

UNITED STATES PATENT OFFICE
CERTIFICATE OF CORRECTION

Patent No. 3,586,501      Dated June 22, 1971

Inventor(s) W. E. Norquist et al

It is certified that error appears in the above-identified patent and that said Letters Patent are hereby corrected as shown below:

IN THE SPECIFICATION:

Column 2, delete lines 53-56 in their entirety - the paragraph is repeated, in proper form, on lines 57-60.

Column 3, line 11, "surfaces" should be --surface--.

Column 4, line 26, "substances" should be --substance--.

Column 4, line 36, after "by" insert --a--.

Column 6, line 61, "19a" should be --18a--.

Column 6, line 72, "59a" should be --58a--.

IN THE CLAIMS:

Claim 1, column 7, line 74, after "margins" delete "and".

Claim 4, column 8, line 25, "determined" should be --determine--.

Claim 14, column 9, line 62, "stressng" should be --stressing--.

Claim 15, column 10, beginning at line 11, "furthermore" should be --furthermost--.

Signed and sealed this 18th day of January 1972.

(SEAL)
Attest:

EDWARD M. FLETCHER, JR.　　　　ROBERT GOTTSCHALK
Attesting Officer　　　　　　　　Acting Commissioner of Patents